(12) United States Patent
Gruhler et al.

(10) Patent No.: US 10,221,878 B2
(45) Date of Patent: Mar. 5, 2019

(54) METHOD FOR PRODUCING A PLASTIC COMPONENT AND PLASTIC COMPONENT

(71) Applicant: ElringKlinger AG, Dettingen (DE)

(72) Inventors: Tobias Michael Gruhler, Pfullingen (DE); Andreas Grupp, Kirchheim (DE); Thomas Semmler, Westerheim (DE)

(73) Assignee: ElringKlinger AG, Kirchheim (DE)

( * ) Notice: Subject to any disclaimer, the term of this patent is extended or adjusted under 35 U.S.C. 154(b) by 0 days.

(21) Appl. No.: 15/482,755

(22) Filed: Apr. 8, 2017

(65) Prior Publication Data

US 2017/0248162 A1 Aug. 31, 2017

Related U.S. Application Data

(63) Continuation of application No. PCT/EP2014/072729, filed on Oct. 23, 2014.

(51) Int. Cl.
*F16B 21/07* (2006.01)
*B29C 45/14* (2006.01)
(Continued)

(52) U.S. Cl.
CPC ...... *F16B 21/071* (2013.01); *B29C 45/14336* (2013.01); *B29C 45/44* (2013.01);
(Continued)

(58) Field of Classification Search
CPC ............. F16B 21/071; F16B 21/073; B29C 45/14336; B29C 45/4407;
(Continued)

(56) References Cited

U.S. PATENT DOCUMENTS

| 5,248,467 | A | * | 9/1993 | Cushman | .......... B29C 45/14786 264/102 |
|---|---|---|---|---|---|
| 8,613,414 | B2 | * | 12/2013 | Rosemann | ............ F16B 21/073 24/297 |
| 2002/0037389 | A1 | * | 3/2002 | Miyano | ............... B29C 45/4407 428/99 |
| 2003/0164577 | A1 | * | 9/2003 | Kieltyka | ................. B29C 45/14 264/255 |
| 2005/0074280 | A1 | * | 4/2005 | Chen | ..................... F16B 21/071 403/329 |

(Continued)

FOREIGN PATENT DOCUMENTS

DE 10 253 448 A1 6/2004
DE 10 2013 207 955 A1 10/2014
(Continued)

*Primary Examiner* — David Sample
*Assistant Examiner* — Donald M Flores, Jr.
(74) *Attorney, Agent, or Firm* — Aslan Law, P.C.

(57) ABSTRACT

In order to provide a method for producing a plastics component by means of which a plastics component having at least one fastening portion for fastening at least one fastening element is producible simply, it is proposed that the method should include producing a base body of the plastics component and at least one fastening portion of the base body in a single method step by means of a molding tool, wherein the fastening portion includes at least one receiving opening into which a fastening element is introducible in a direction of introduction, for the purpose of fixing it to the fastening portion, wherein the fastening portion includes at least one undercut portion which adjoins the receiving opening in the direction of introduction and to which the fastening element is fixable with positive engagement for the purpose of fixing it in opposition to the direction of introduction.

16 Claims, 14 Drawing Sheets

(51) Int. Cl.
  *B29C 45/44* (2006.01)
  *B29L 31/00* (2006.01)
  *B29C 45/33* (2006.01)
  *B29C 45/00* (2006.01)
  *B29K 101/12* (2006.01)
  *B29K 705/00* (2006.01)
  *B29L 31/30* (2006.01)
(52) U.S. Cl.
  CPC ........ *B29C 45/4407* (2013.01); *F16B 21/073* (2013.01); *B29C 45/33* (2013.01); *B29C 2045/0093* (2013.01); *B29K 2101/12* (2013.01); *B29K 2705/00* (2013.01); *B29L 2031/30* (2013.01); *B29L 2031/727* (2013.01)
(58) Field of Classification Search
  CPC . B29C 2045/0093; B29C 45/44; B29C 45/33; B29K 2101/12; B29K 2705/00; B29L 2031/30; B29L 2031/727
  See application file for complete search history.

(56) References Cited

U.S. PATENT DOCUMENTS

| | | | |
|---|---|---|---|
| 2006/0154023 A1* | 7/2006 | Maki | B29C 45/0055 428/122 |
| 2009/0113678 A1* | 5/2009 | Shimizu | A44B 17/0047 24/662 |
| 2011/0142535 A1* | 6/2011 | Molnar | B29C 45/4435 403/220 |
| 2015/0102621 A1* | 4/2015 | Smyth | B60R 13/02 296/1.08 |

FOREIGN PATENT DOCUMENTS

| | | |
|---|---|---|
| EP | 0 885 710 A1 | 12/1998 |
| EP | 2 213 886 A2 | 8/2010 |
| EP | 2 366 526 A1 | 9/2011 |
| FR | 2 768 360 A1 | 3/1999 |
| FR | 2 799 407 A1 | 4/2001 |
| WO | WO 2013/088447 A1 | 6/2013 |
| WO | WO 2013/171266 A1 | 11/2013 |

* cited by examiner

METHOD FOR PRODUCING A PLASTIC COMPONENT AND PLASTIC COMPONENT

RELATED APPLICATION

This application is a continuation of international application No. PCT/EP2014/072729 filed on Oct. 23, 2014, which is incorporated herein by reference in its entirety and for all purposes.

FIELD OF DISCLOSURE

The present invention relates to a method for producing a plastics component, for example for a power train of a motor vehicle or for other applications.

BACKGROUND

In plastics components, fastening points are preferably provided in order to be able to fix for example hoses, cables and other lines to the plastics component. The fastening points are in this case formed for example by metal inserts in a plastics base body of the plastics component.

SUMMARY OF THE INVENTION

The object of the present invention is to provide a method for producing a plastics component by means of which a plastics component having at least one fastening portion for fastening at least one fastening element is producible simply.

This object is achieved according to the invention by a method for producing a plastics component that includes the following:

Producing a base body of the plastics component and at least one fastening portion of the base body in a single method step by means of a moulding tool, wherein the fastening portion includes at least one receiving opening into which a fastening element is introducible in a direction of introduction, for the purpose of fixing it to the fastening portion, wherein the fastening portion includes at least one undercut portion which adjoins the receiving opening in the direction of introduction and to which the fastening element is fixable with positive engagement for the purpose of fixing, in particular anchoring, it in opposition to the direction of introduction.

Because, according to the invention, the base body and at least one fastening portion are produced in a single method step, it is possible for the plastics component to be produced simply and thus preferably also inexpensively.

In one embodiment of the invention, it may be provided for the base body and the at least one fastening portion to be produced by an injection moulding method.

In particular, it may be provided for the at least one fastening portion to be producible by suitable shaping of the base body.

It may be favourable if the moulding tool takes the form of a female mould tool.

In one embodiment of the invention, it may be provided for at least one fastening portion, in particular at least one undercut portion, to be formed by means of at least one projection from the moulding tool that widens in the direction of the workpiece and/or in a direction of introducing the fastening element.

A projection from the moulding tool that widens in the direction of the workpiece is in particular a portion of the moulding tool that projects from a base body of the moulding tool and widens from the base body.

During production of the base body and the fastening portion, the at least one projection from the moulding tool is preferably surrounded, in particular overmoulded, by the material of the base body.

The at least one projection is preferably removed from the fastening portion, in particular the undercut portion, by deforming the moulding tool and/or by deforming the plastics component.

The moulding tool and/or the plastics component is/are for this purpose preferably constructed to be elastically deformable, at least in certain portions and/or at least temporarily, in particular before complete curing.

It may be provided for the moulding tool to include two shaping halves that are movable in relation to one another and have surfaces which are formed to be substantially complementary to a respective side of the base body.

At least one shaping element of the moulding tool, in particular at least one projection from a female mould tool, may be moved preferably in relation to one or in relation to both shaping halves.

It may be advantageous if at least one shaping element is moved while or after the plastics component is removed from the moulding tool.

As an alternative or in addition thereto, it may be provided for at least one shaping element to be moved such that the plastics component may be removed from the moulding tool.

It may be provided for at least one movable or mobile shaping element to be connected to the moulding tool, in particular to a shaping half of the moulding tool, by means of a coupling element, in particular a spring connection.

The at least one shaping element is preferably movable optionally and/or repeatedly into a moulding position and/or into a demoulding position.

In one embodiment of the invention, it may be provided, for the purpose of removing the plastics component from the moulding tool, for first at least one shaping half and then at least one shaping element arranged movably on this shaping half to be moved away from the plastics component.

In particular, it may be provided, for the purpose of removing the plastics component from the moulding tool or to move it away from the moulding tool, for first at least one shaping half and then at least one shaping element that is coupled to the shaping half, in particular a widening projection, to be removed from the plastics component.

For example, it may be provided, for the purpose of removing the plastics component from the moulding tool, for first at least one shaping half to be removed from the plastics component and then at least one shaping element to be withdrawn from the plastics component, in particular from the fastening portion, for example from the undercut portion.

As an alternative or in addition thereto, it may be provided, for the purpose of removing the plastics component from the moulding tool, for first at least one shaping element that is arranged movably on a shaping half and then this shaping half to be moved away from the plastics component.

In particular, it may be provided for at least one shaping element, for example a slider, to be movable in a direction that is oriented transversely, in particular perpendicular, to the direction in which the shaping half is removed from the plastics component.

The undercut portion of at least one fastening portion is preferably formed by a shaping element of the moulding tool that is movable transversely, in particular perpendicular, to the direction of introducing the fastening element.

The term "receiving opening of the fastening portion" in this description and the accompanying claims should in particular be understood not to mean a through opening in the plastics component such that it is possible for a material to pass from a first side of the plastics component to a second side of the plastics component, opposite the first side. Thus, the receiving opening is in particular not a perforation in the plastics component.

In one embodiment of the invention, it is provided for at least one through opening that extends on only one side of the base body to be formed by means of a projection from the moulding tool for making the at least one receiving opening and by means of at least one movable shaping element of the moulding tool. In particular, this through opening does not form a connection between mutually opposite sides of the plastics component.

By means of the method according to the invention, it is possible in particular to produce a plastics component simply.

For this reason, the present invention also relates to a plastics component.

In this respect, the object of the invention is to provide a plastics component that is producible simply and inexpensively.

According to the invention, this object is achieved by a plastics component that includes a base body that includes at least one fastening portion, wherein the base body and the at least one fastening portion are made in one piece with one another, wherein the at least one fastening portion includes at least one receiving opening into which a fastening element is introducible in a direction of introduction for the purpose of fixing it to the fastening portion, wherein the at least one fastening portion includes at least one undercut portion which adjoins the receiving opening in the direction of introduction and to which the fastening element is fixable with positive engagement for the purpose of fixing it in opposition to the direction of introduction.

Preferably, the plastics component according to the invention has individual or multiple features and/or advantages described in conjunction with the method according to the invention.

The plastics component is preferably a one-piece injection moulded component.

In one embodiment of the invention, it is provided for the plastics component to include a wall, in particular a housing wall, and at least one fastening portion, wherein by means of the wall, in particular the housing wall, an inside and an outside of the plastics component are separated or separable from one another, and wherein at least one fastening portion is arranged entirely on a side of the wall, in particular of the housing wall, that faces the inside or the outside.

The wall, in particular the housing wall, thus preferably has no opening, in particular no through opening (perforation) in the region of the fastening portion.

It may be favourable if the plastics component includes a wall, in particular a housing wall, and at least one fastening portion, wherein by means of the wall, in particular the housing wall, an inside and an outside of the plastics component are separated or separable from one another, and wherein at least one fastening portion extends away from the wall, in particular the housing wall.

At least one fastening portion includes preferably at least one element that is at least temporarily elastic, in particular in order to enable the receiving opening to be elastically deformed. This allows a fastening element to be arranged on the fastening portion and to be removed therefrom simply.

The fastening portion and the wall, in particular the housing wall, are preferably made in one piece with the base body. In particular, the fastening portion and the wall, in particular the housing wall, are constituent parts of the base body.

At least one receiving opening is preferably delimited laterally from at least one elastic element of the fastening portion. A cross section through the receiving opening taken perpendicular to the direction of introduction is consequently preferably variable.

At least one undercut portion is preferably formed by a cavity in the plastics component.

The cavity is preferably only open on one side, that is to say it is only open to one side of the plastics component. In particular, it may be provided for the cavity to be accessible exclusively through the receiving opening.

The cavity is in particular open to an outside of the plastics component.

However, it may also be provided for the cavity to be open on two sides. Preferably in that case, however, both openings of the cavity are arranged on a single side of the plastics component, in particular on an outside of the plastics component.

For example, it may be provided for at least one fastening portion to take the form of a substantially hollow cylindrical element, in particular a hollow cylindrical receptacle. In this way, in particular rotationally symmetrical fastening elements may be fastened simply and reliably in the at least one fastening portion.

It may be provided for a wall of at least one fastening portion to include at least one recess, in particular a slot-shaped recess. As a result, the fastening portion may preferably be made flexible, elastic or yielding in another way in order in particular to enable a widening projection from a moulding tool to be removed more simply and/or to enable at least one fastening element to be fixed to the fastening portion and/or removed therefrom more simply.

The plastics component according to the invention is preferably suitable for all the sections of a power train of a motor vehicle, for example as a constituent part of a motor, in particular as a constituent part of a valve cover, a cylinder head cover or an oil sump.

It may further be provided for the plastics component to be a constituent part of a clutch case, a transmission case, a differential case and/or a drive shaft housing.

Likewise, it may be provided for the plastics component to be a component of an electric motor and/or a battery case.

The plastics component according to the invention is further suitable for further applications besides a power train of a motor vehicle, in particular as a component of a motor vehicle other than the power train or components associated therewith.

For example, the plastics component may be a cross member, a front end device and/or an instrument panel.

The present invention further relates to a motor vehicle, in particular a passenger vehicle (car) and/or a commercial vehicle (lorry), that includes at least one plastics component according to the invention.

Preferably, the motor vehicle according to the invention has individual or multiple features and/or advantages described in conjunction with the method according to the invention and/or the plastics component according to the invention.

Further, the method according to the invention for producing a plastics component, the plastics component according to the invention and/or the motor vehicle according to the invention may have individual or multiple features and/or advantages described below.

As the material for the plastics component, in particular a thermoplastics material may be provided.

As the fastening element, in particular a self-locking fastening element, in particular a cable tie, may be provided.

At least one fastening portion, in particular at least one receiving opening, is preferably dimensioned such that fastening elements which, in the case of conventional plastics components, are fixable in receptacles for M5, M6 or M8 screws are fixable therein.

In the method according to the invention, preferably a forced demoulding is performed, that is to say that the plastics component partly surrounds the moulding tool and so is only detachable from the moulding tool by the application of an additional force and/or by deformation of the plastics component.

The method according to the invention is preferably a production-ready moulding method, that is to say that the plastics component is finished once it has been removed from the moulding tool. Preferably, as a result only a single work cycle is required.

The moulding tool preferably includes a shaping half that takes the form of a mould core half and a shaping half that takes the form of a cavity plate half.

The plastics component may for example be formed exclusively from a plastics material, for example a thermoplastics material.

Further, it may be provided for the plastics component to be a component that includes a plastics material, in particular a thermoplastics material.

The plastics component may for example be a hybrid component that includes a base body made from a plastics material, and a further element, for example an additional element or a support element of the plastics component.

An additional element or support element of the plastics component is preferably made from a metallic material.

For example, it may be provided for an additional element or support element of the plastics component to take the form of a metal profile or metal tube.

The additional element or support element of the plastics component may for example have a rectangular, in particular square, round or oval cross section.

The additional element or support element of the plastics component may for example take the form of a closed or an open profile.

For example, a cross section of the additional element or the support element is substantially T-shaped, I-shaped (in the shape of a double T support), U-shaped, etc.

The additional element or the support element of the plastics component may for example be a component that has been given a desired shape by an internal high-pressure forming process.

In one embodiment of the invention, it is provided for the base body of the plastics component and the at least one fastening portion of the base body to be moulded on in an injection moulding method onto an additional element or support element of the plastics component.

The additional element or support element of the plastics component is in particular introducible into the moulding tool as an insert element, and is injection mouldable or overmouldable with plastics.

Further preferred features and/or advantages of the invention form the subject matter of the description below and the representation in the drawing of exemplary embodiments.

BRIEF DESCRIPTION OF THE DRAWINGS

Like or functionally equivalent elements are provided with like reference numerals in all the Figures.

DETAILED DESCRIPTION OF THE DRAWINGS

Figure 1:
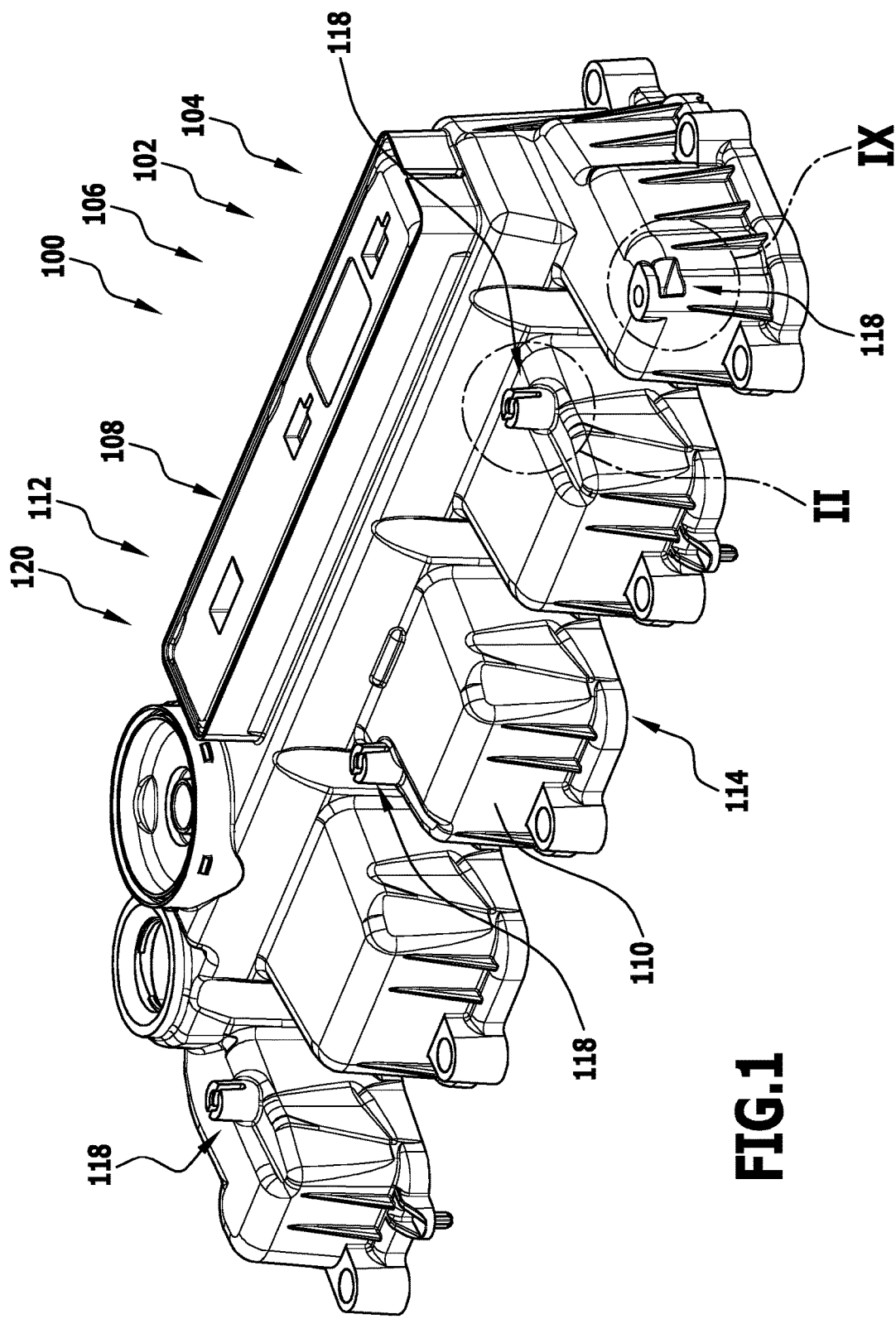
FIG. 1 shows a schematic perspective illustration of a plastics component, which includes two different embodiments of fastening portions.

A plastics component that is illustrated in FIG. 1 and is designated 100 as a whole takes the form for example of a valve cover 102 or a cylinder head cover 104.

The plastics component 100 is in particular an injection moulded component 106 that is producible using an injection moulding device (described below).

The plastics component 100 includes a base body 108 that includes a wall 110, in particular a housing wall 110.

By means of the wall 110 of the base body 108, in particular an exterior 112 is separable from an interior 114.

Here, the interior 114 is in particular a valve chamber of an internal combustion engine if the plastics component 100 takes the form of a valve cover 102.

In the assembled condition of an internal combustion engine that includes the plastics component 100, it may be advantageous if a plurality of lines, ducts, cables, etc. can be fixed to the plastics component 100.

For this purpose, fastening elements 116 may be provided (see FIG. 2) that may be fixed to fastening portions 118 of the plastics component 100.

The fastening portions 118 are in this case arranged on the base body 108 such that it is possible to fasten the fastening elements 116 to an outside 120 of the plastics component 100 that faces the exterior 112.

A first embodiment, illustrated in FIGS. 2 to 8, of a fastening portion 118 includes for example a hollow cylindrical receptacle 122.

The hollow cylindrical receptacle 122 includes a wall 124 that is substantially in the shape of a cylindrical outer face and surrounds a cavity 126.

Here, the receptacle 122 is oriented such that an axis of symmetry 128 of the receptacle 122 runs substantially perpendicular to a main direction of extent 129 of the wall 110 in the region of the fastening portion 118.

In particular, the receptacle 122 projects away from the wall 110.

At an end 130 of the receptacle 122 that is remote from the wall 110, a receiving opening 132 is provided through which the cavity 126 is accessible.

A fastening element 116 is introducible, at least in certain regions, into the cavity 126 through this receiving opening 132, in a direction of introduction 134.

The cavity 126 tapers in the direction of the end 130 of the receptacle 122, with the result that an undercut portion 136 of the fastening element 118, arranged behind the receiving opening 132 as seen in the direction of introduction 134, is formed.

The fastening element 116 may be fixed to the undercut portion 136 with positive engagement.

The receptacle 122 further includes two slot-shaped recesses 138 that extend substantially parallel to the axis of symmetry 128 and divide the wall 124 into two mutually opposed wall portions 140.

Because of the slot-shaped recesses 138, the wall portions 140 of the receptacle 122 are movable, in particular are elastically deformable, at least in certain regions in relation to one another and/or in relation to a base portion 142 of the receptacle 122.

In particular, the wall portions 140 may be moved away from one another at the end 130 of the receptacle 122 that is remote from the wall 110. The size of the receiving opening 132 is thus variable, at least to a small extent.

The fact that the receiving opening 132 is variable in size is in particular advantageous for producing the plastics component 100.

Figure 2:
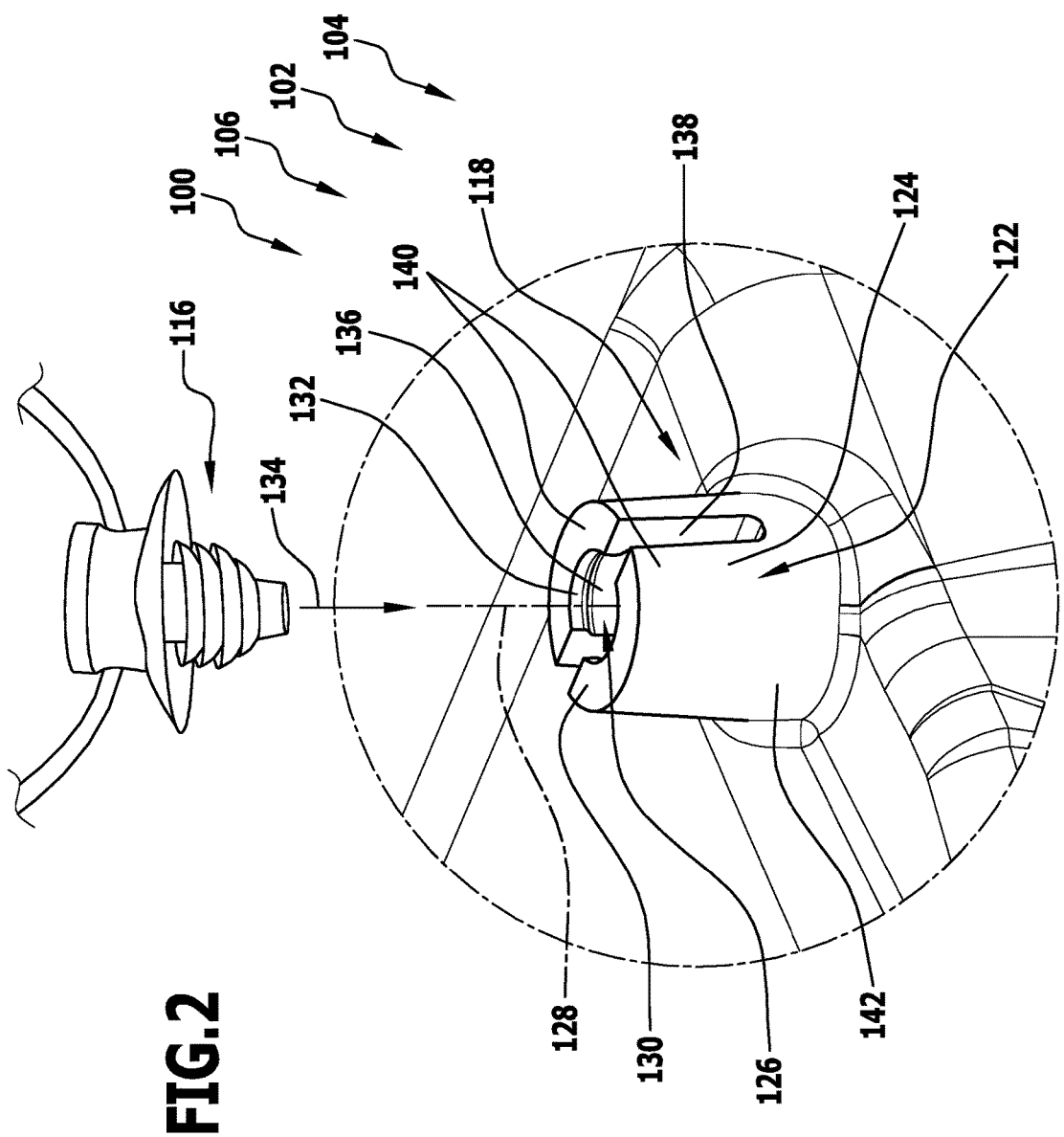
FIG. 2 shows an illustration of the region II in FIG. 1, on a larger scale.
Figure 3:
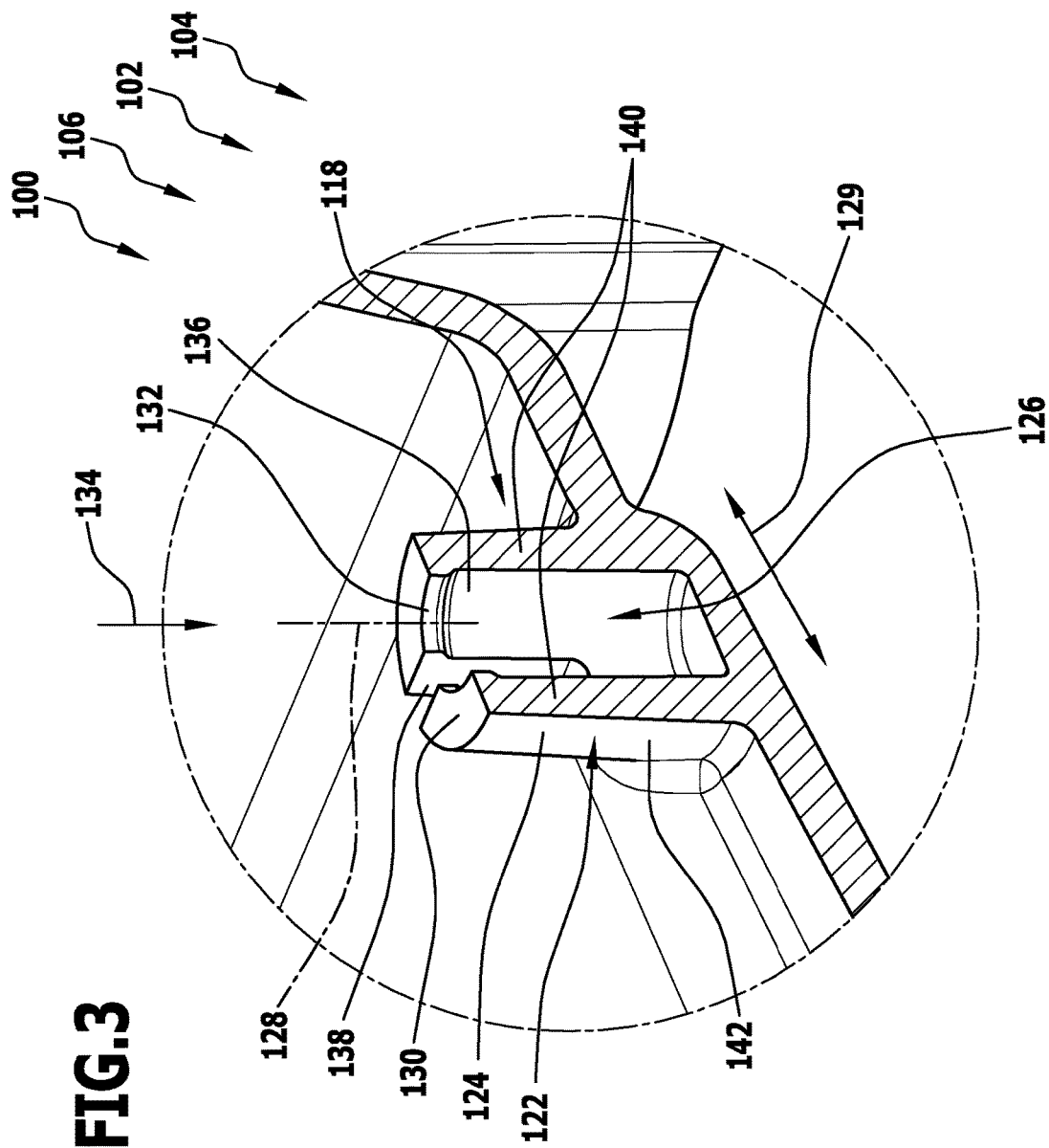
FIG. 3 shows an illustration of the region II in FIG. 1, partly cut away and on a larger scale.
Figure 4:
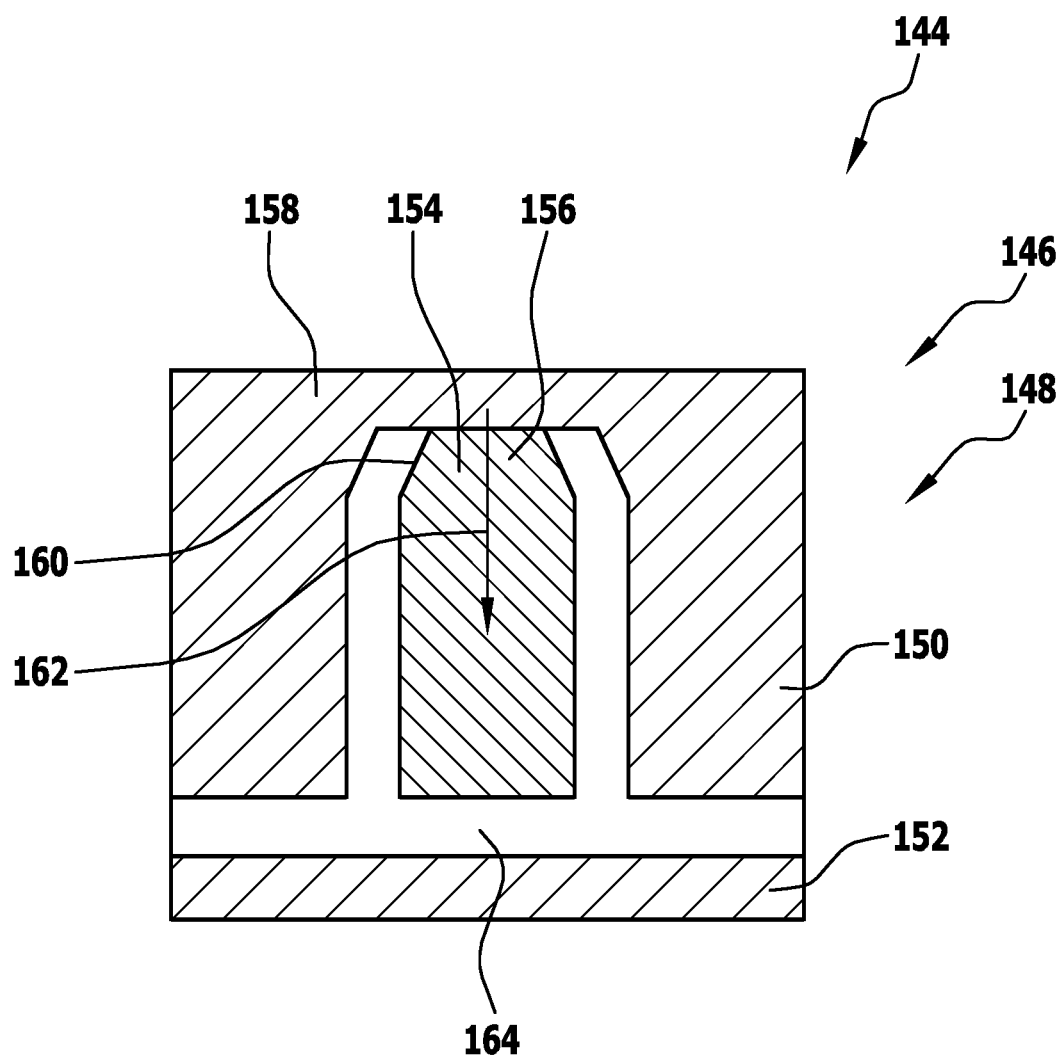
FIG. 4 shows a schematic sectional illustration of an injection moulding device for producing a plastics component that includes a fastening portion according to FIG. 2, wherein the injection moulding device is in a starting condition in which an interior of the injection moulding device is empty.
Figure 9:
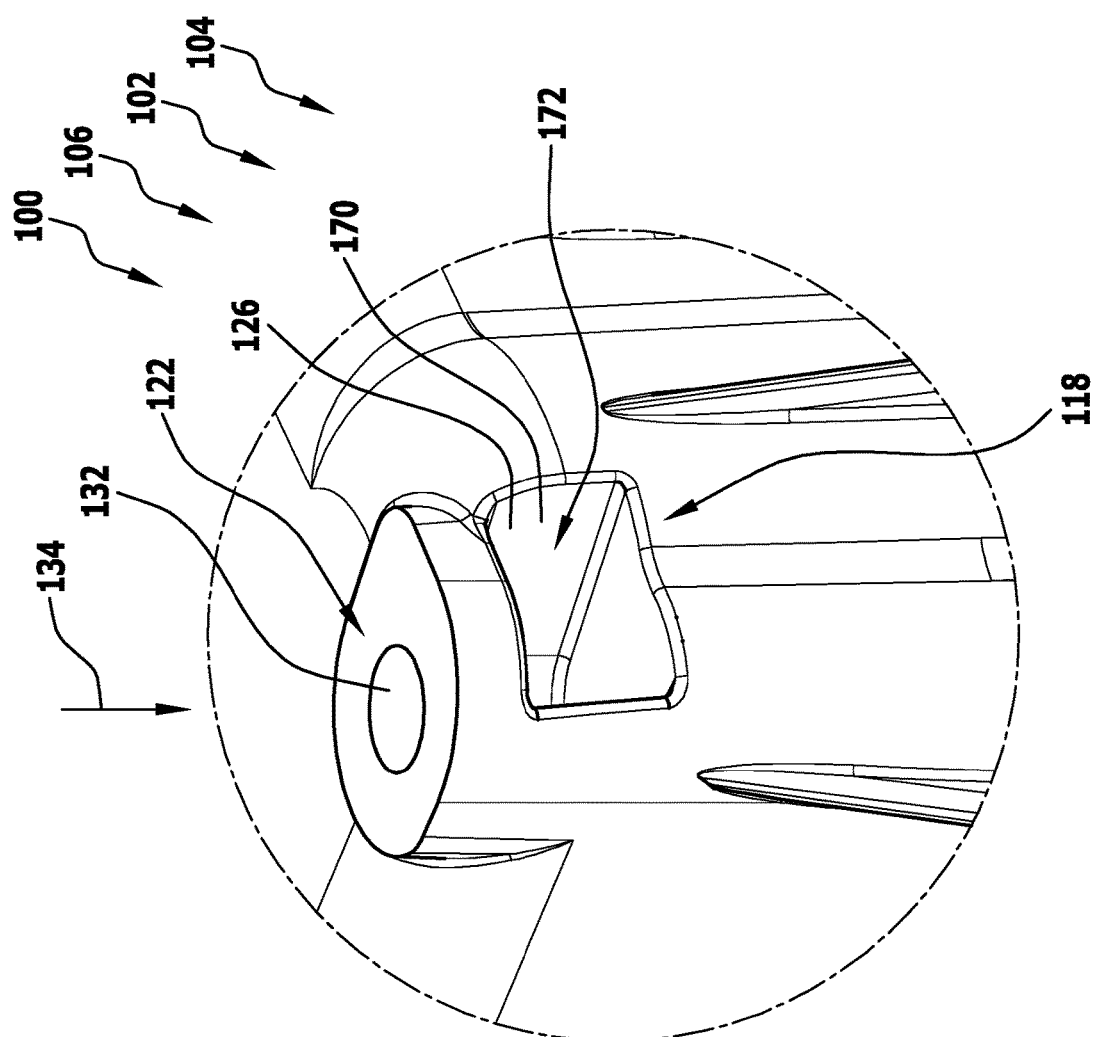
FIG. 9 shows an illustration of the region IX in FIG. 1, on a larger scale.

The fastening portion 118 of the plastics component 100 that is illustrated in FIGS. 2 and 3 is produced, in particular together with the plastics component 100 and/or together with the fastening portion 118 that is illustrated in FIG. 9, by means of an injection moulding device 144, as follows:

The injection moulding device 144 for producing the plastics component 100 includes a moulding tool 146, in particular a female mould tool 148.

The moulding tool 146 includes a first shaping half 150, in particular a cavity plate half, and a second shaping half 152, in particular a mould core half.

The first shaping half 150 includes a shaping element 154 that forms a projection 156 from the first shaping half 150.

The shaping element 154 is in particular constructed to be movable in relation to a base body 158 of the first shaping half 150.

The projection 156 includes a widening portion 160.

Thus, the projection 156 is a widening projection 156, in relation to a direction of extent 162 of the projection 156 pointing away from the base body 158.

The moulding tool 146 has an interior 164 that is surrounded by the first shaping half 150 and the second shaping half 152 and has a shape substantially corresponding to the plastics component 100 to be produced. Filling the interior 164 with an injection moulding material can thus form the plastics component 100 (see FIG. 5).

Figure 5:
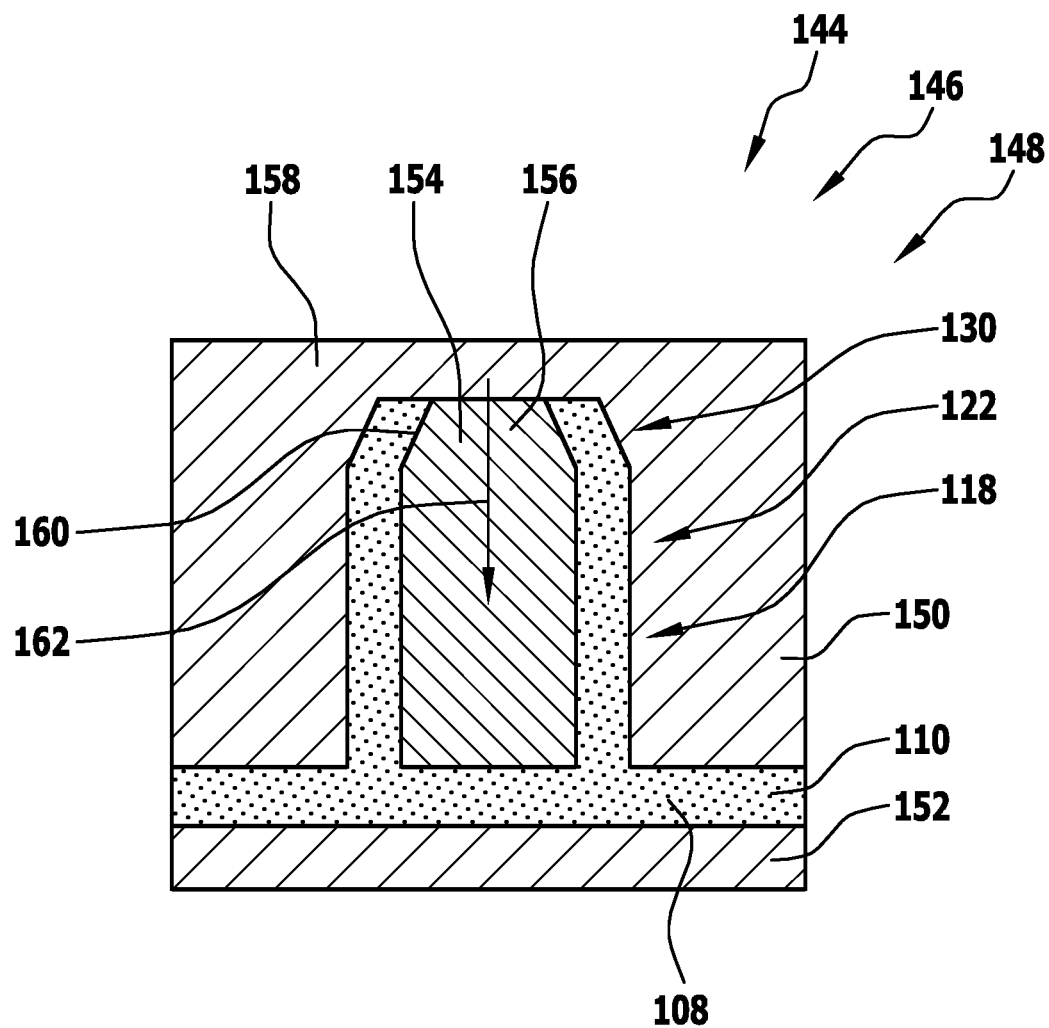
FIG. 5 shows a schematic illustration, corresponding to FIG. 4, of the injection moulding device, wherein the interior is filled with an injection moulding material.

As can be seen in particular from FIG. 5, the plastics component 100 that is made in the interior 164 surrounds the widening projection 156 by means of the end 130 of the receptacle 122.

Thus, the projection 156 cannot be readily removed from the cavity 126 of the receptacle 122.

Figure 6:
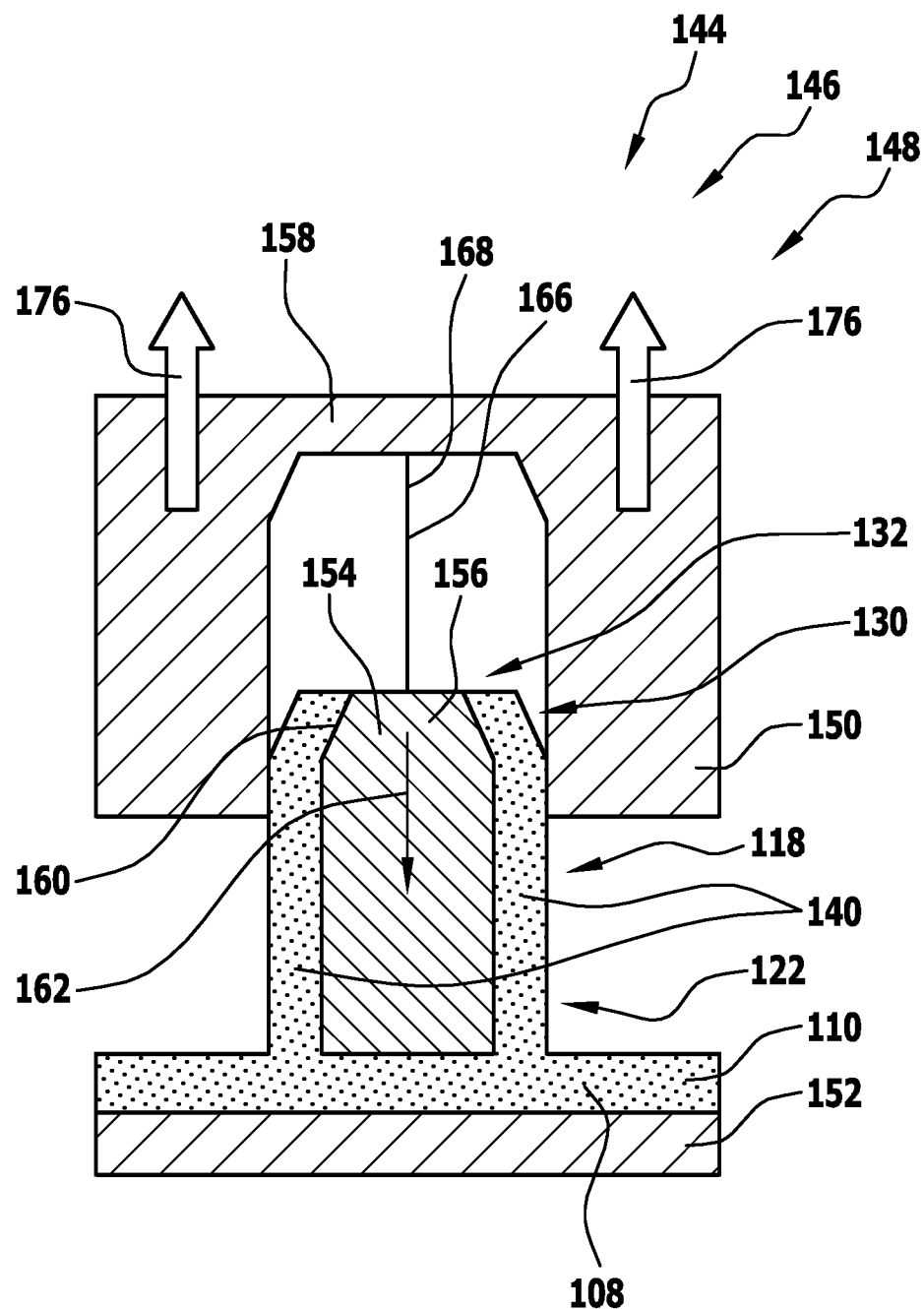
FIG. 6 shows a schematic illustration, corresponding to FIG. 5, of the injection moulding device, wherein a first shaping half is being removed from a plastics component that has been produced.
Figure 7:
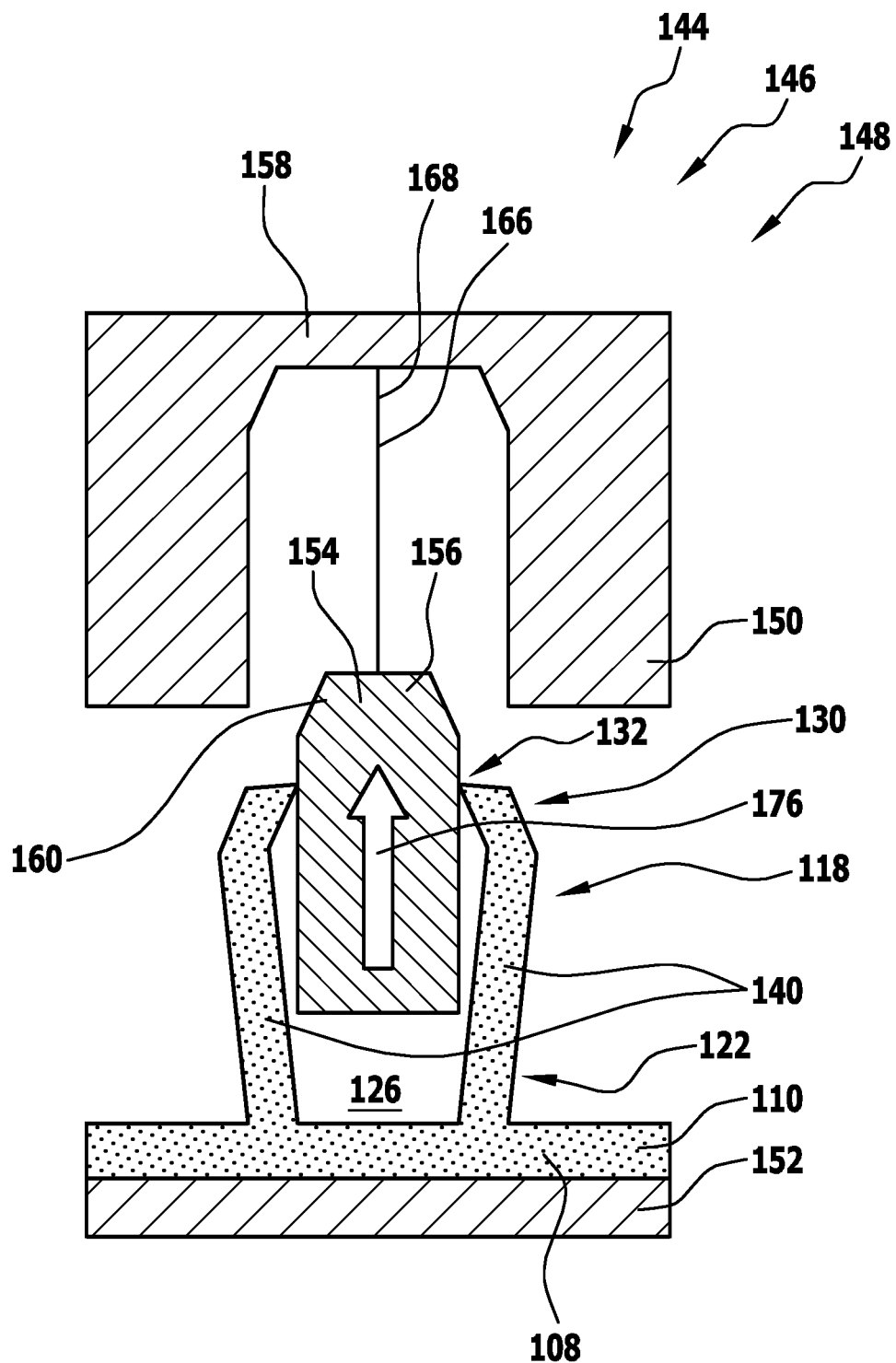
FIG. 7 shows a schematic illustration, corresponding to FIG. 6, of the injection moulding device, wherein the first shaping half and a shaping element that is connected to this first shaping half are being removed from the plastics component.
Figure 8:
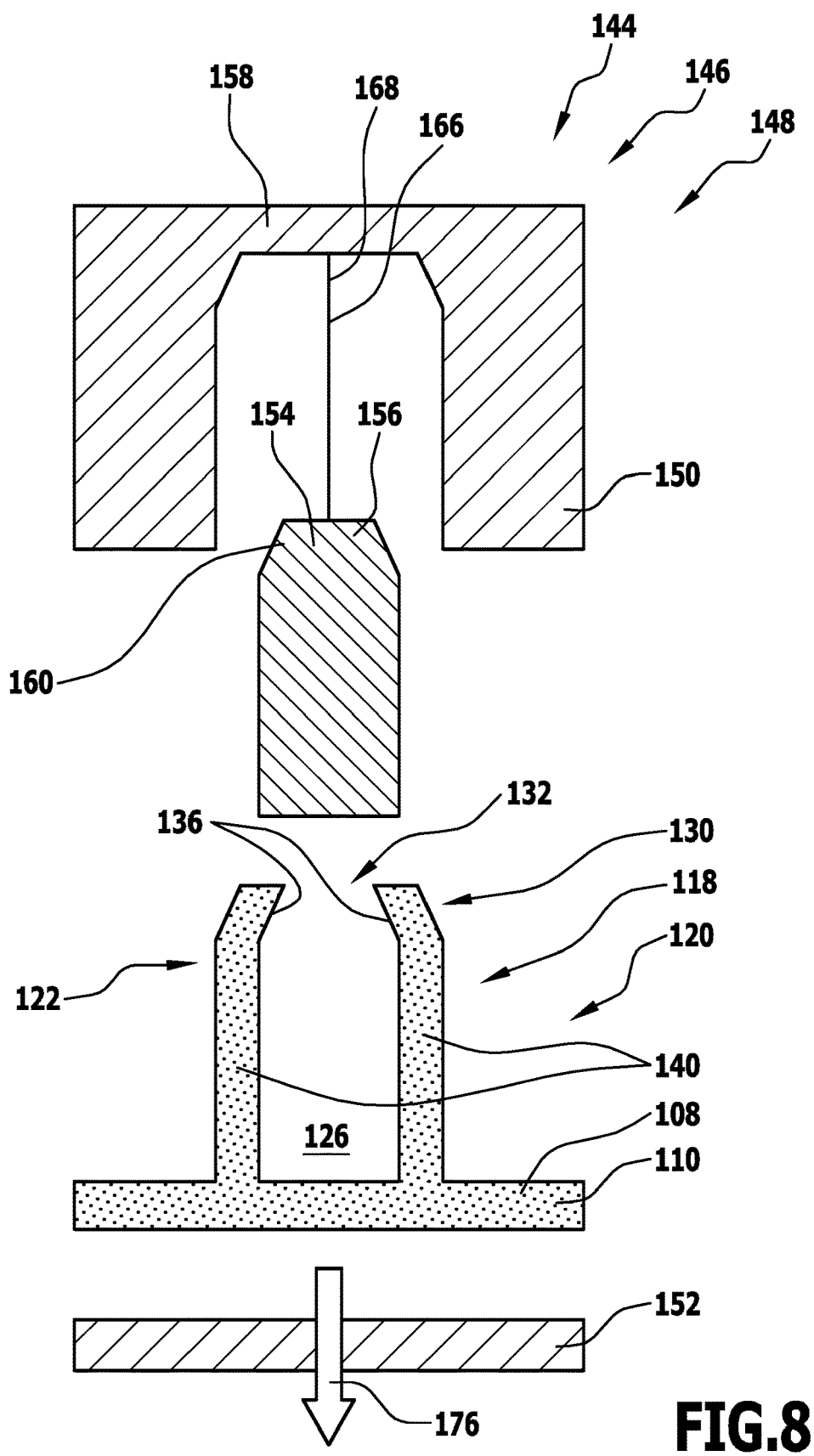
FIG. 8 shows a schematic illustration, corresponding to FIG. 7, of the injection moulding device, wherein both shaping halves and the movable shaping element have been removed from the plastics component.

As can be seen from FIG. 6, the projection 156 that is formed by the movable shaping element 154 is not permanently connected to the base body 158 of the first shaping half 150, but is connected to the base body 158 of the first shaping half 150 by means of a coupling element 166.

The coupling element 166 is in particular a spring element 168.

Thus, the base body 158 of the first shaping half 150 can be removed from the plastics component 100, while the projection 156 initially remains in the cavity 126 of the receptacle 122 of the plastics component 100 (see FIG. 6).

Once the wall 124 of the receptacle 122 is no longer surrounded by the base body 158 of the first shaping half 150, the wall portions 140 of the receptacle 122 can be elastically deformed to make the receiving opening 132 larger. In this way, the movable shaping element 154 that forms the projection 156 can be removed from the cavity 126 of the receptacle 122 through the receiving opening 132 (see FIG. 7).

Once the movable shaping element 154 has been removed from the cavity 126 of the receptacle 122, the preferably elastic wall portions 140 spring back into the original position automatically, such that the receptacle 122 once again adopts the shape corresponding to the interior 164 of the moulding tool 146.

Thus, using the injection moulding device 144 it is particularly simple to form a fastening portion 118 for the fastening of fastening elements 116, in particular in a single method step, during production of the plastics component 100.

An alternative embodiment of a fastening portion 118 that is illustrated in FIG. 9 differs from the embodiment illustrated in FIGS. 2 to 8 substantially in that the receptacle 122 is not in cylindrical form and the cavity 126 of the receptacle 122 is accessible from two sides.

In the embodiment of the fastening portion 118 that is illustrated in FIG. 9, a receiving opening 132 through which the cavity 126 is accessible is provided.

Further, a lateral opening 170, which is arranged laterally on the receptacle 122 in relation to the direction of introduction 134 in which a fastening element 116 is introducible into the receiving opening 132, and through which the cavity 126 is likewise accessible, is provided.

A through opening 172 is thus formed by means of the receiving opening 132, the lateral opening 170 and the cavity 126.

In this arrangement, the through opening 172 extends exclusively on the outside 120 of the plastics component 100, facing the exterior 112. In particular, no hole connecting the interior 114 and the exterior 112 to one another is formed in the plastics component 100 by the through opening 172.

In the embodiment of the fastening portion 118 that is illustrated in FIG. 9, the undercut portion 136 for fixing a fastening element 116 to the receptacle 122 with positive engagement results from the fact that the cavity 126 of the receptacle 122, which is arranged behind the receiving opening 132 in relation to the direction of introduction 134, has a larger cross section than the receiving opening 132 itself.

Figure 10:
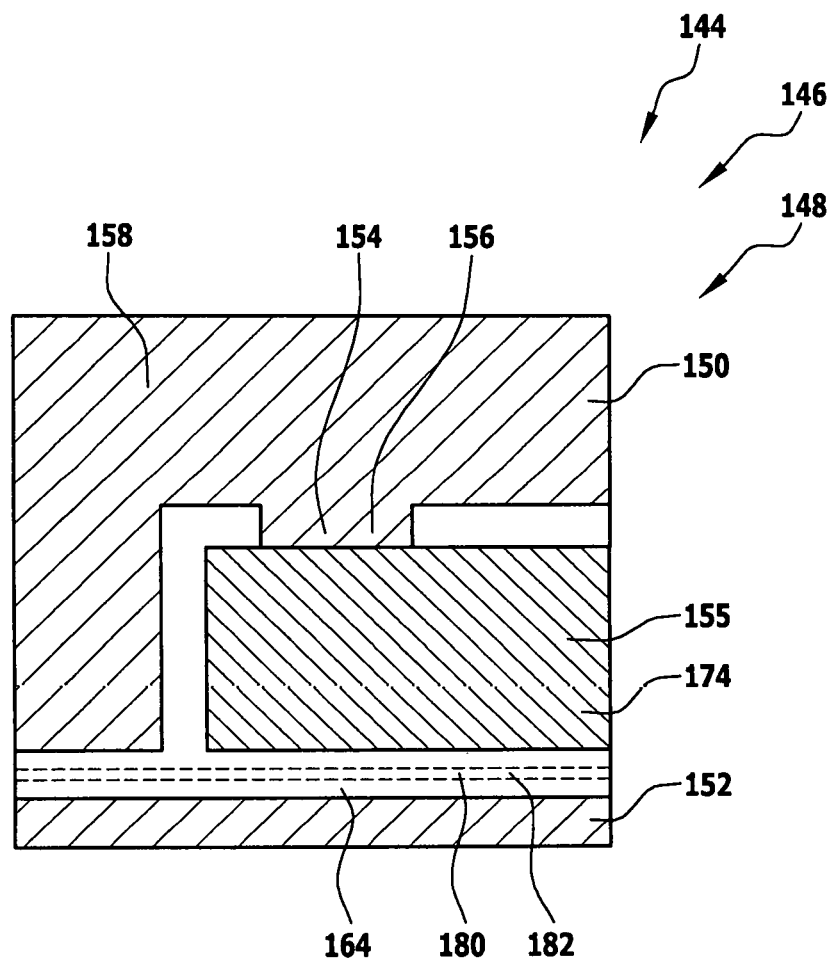
FIG. 10 shows a schematic sectional illustration, corresponding to FIG. 4, of an injection moulding device for producing a plastics component that includes a fastening portion according to FIG. 9, wherein the injection moulding device is in a starting condition in which an interior of the injection moulding device is empty.
Figure 11:
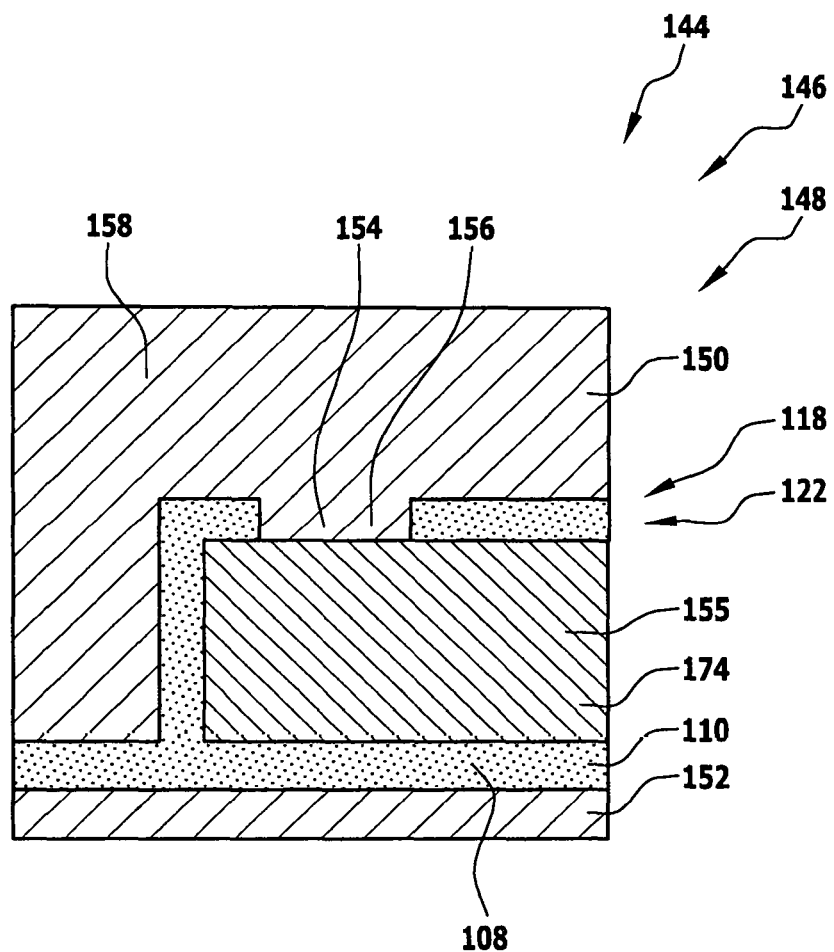
FIG. 11 shows a schematic illustration, corresponding to FIG. 5, of the injection moulding device in FIG. 10, wherein the interior is filled with an injection moulding material.

The fastening portion 118 that is illustrated in FIG. 9 is produced as follows:

By means of the injection moulding device 144, the interior 164 of the moulding tool 146 is filled with injection moulding material (see FIGS. 10 and 11).

For the purpose of forming the fastening portion 118 according to FIG. 9, a movable shaping element 155, in particular a slider element 174, is provided that, in the moulding position illustrated in FIG. 10, is in contact with a projection 156 from the first shaping half 150 of the moulding tool 146.

Here, a bridge to the first shaping half 150 is formed by means of the movable shaping element 155 and the projection 156.

The interior 164 that is present between the shaping halves 150, 152 is filled with the injection moulding material.

As can be seen in particular from FIG. 11, this has the result that the movable shaping element 155 is surrounded by the plastics component 100 as regards the directions of demoulding 176 in which the shaping halves 150, 152 are removable from one another and from the plastics component 100.

While the shaping element movable 155 is arranged in the moulding position, moving the shaping element 155 together with the base body 158 of the first shaping half 150 would thus result in damage to the plastics component 100.

Figure 12:
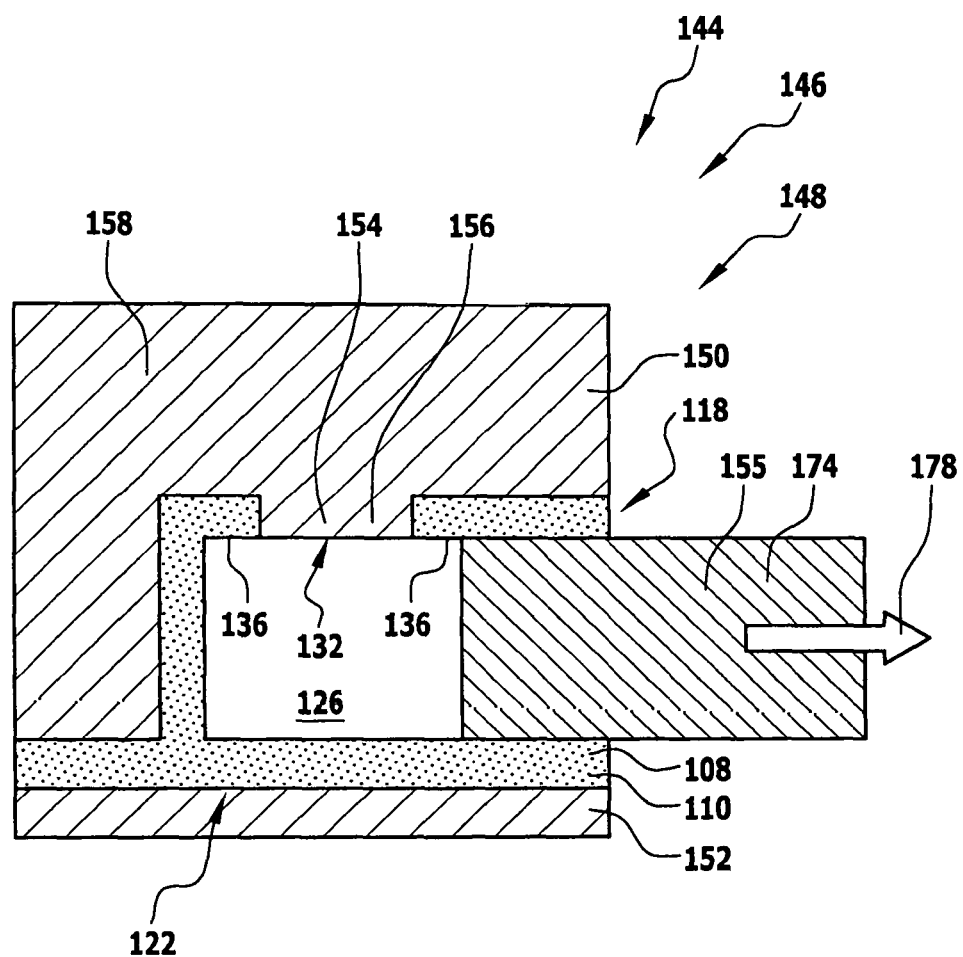
FIG. 12 shows a schematic illustration, corresponding to FIG. 6, of the injection moulding device in FIG. 10, wherein a movable shaping element is being removed from the plastics component in a transverse direction.

In order to avoid damage of this kind, the movable shaping element 155 is thus moved in a transverse direction 178 that is oriented transversely, in particular perpendicular, to the demoulding direction 176, and in this way is moved away from the plastics component 100 (see FIG. 12).

Figure 13:
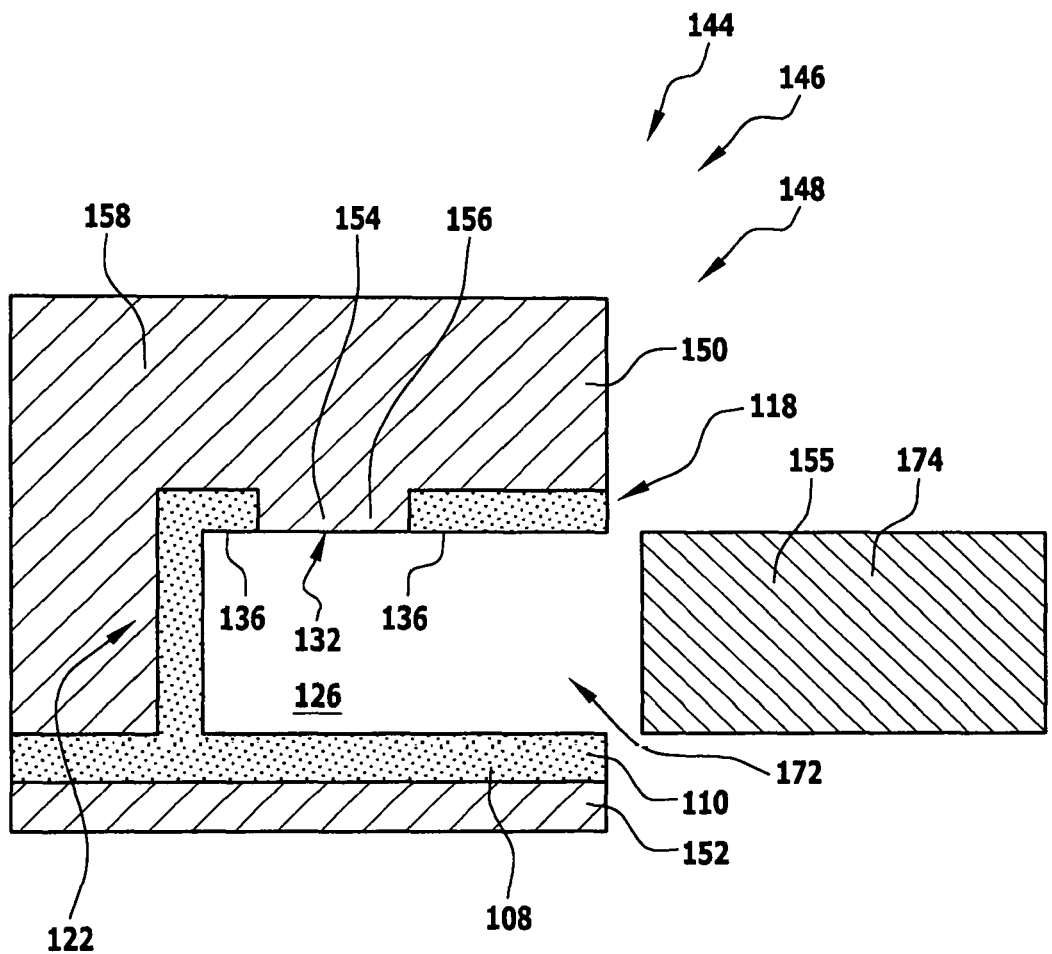
FIG. 13 shows a schematic illustration, corresponding to FIG. 12, of the injection moulding device in FIG. 10, wherein the movable shaping element has been removed from the plastics component.
Figure 14:
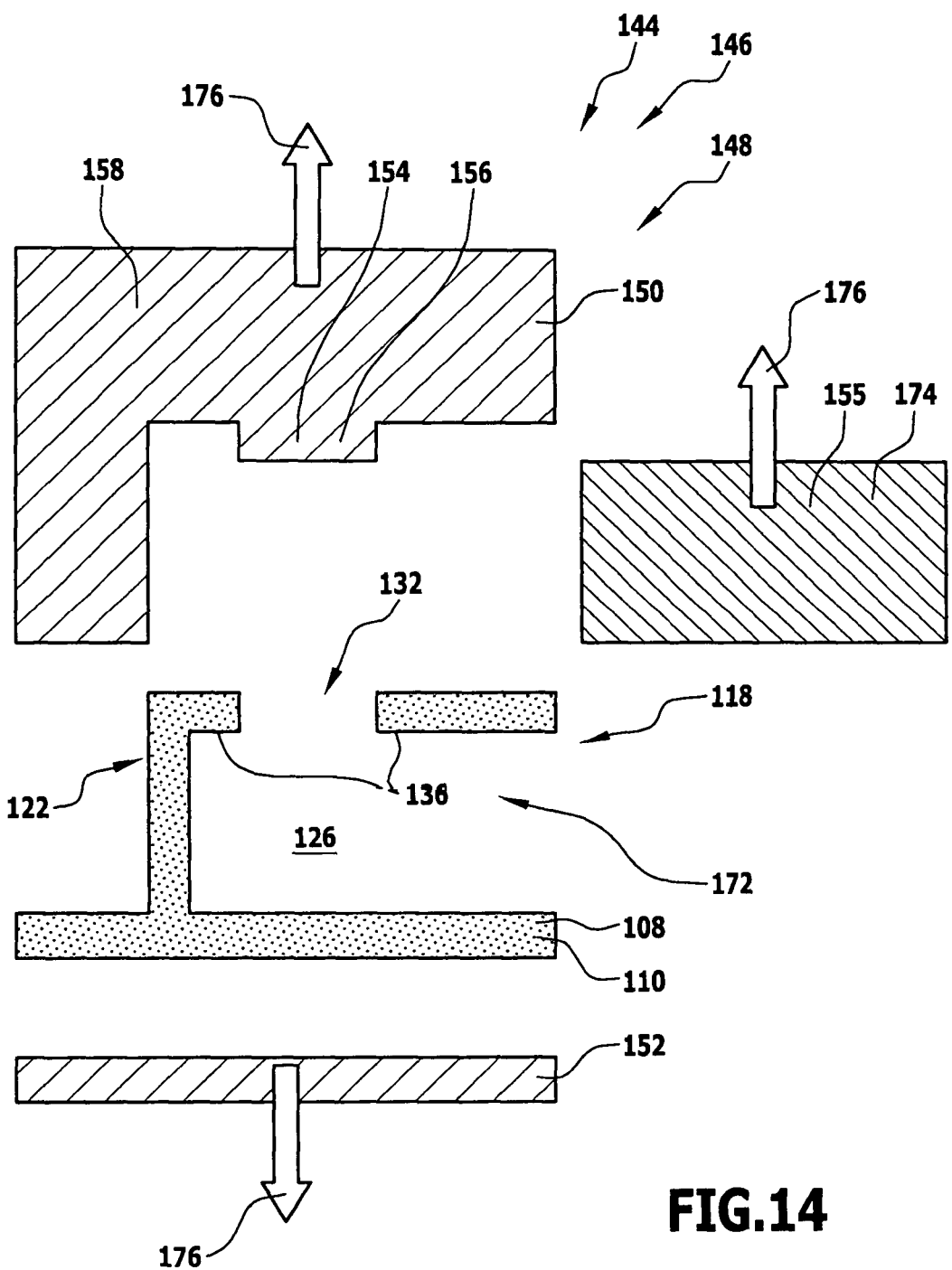
FIG. 14 shows a schematic illustration, corresponding to FIG. 13, of the injection moulding device in FIG. 10, wherein both shaping halves of the injection moulding device have been removed, together with the movable shaping element, from the plastics component.

As soon as the movable shaping element 155 has arrived at the demoulding position illustrated in FIG. 13, it is possible to move the movable shaping element 155, together with the base body 158 of the first shaping half 150, in the demoulding direction 176 and to move it away from the plastics component 100 without the risk of damage to the plastics component 100.

Otherwise, the embodiment of the fastening portion 118 that is illustrated in FIGS. 9 to 14 corresponds, as regards its structure, functioning and production method, to the embodiment illustrated in FIGS. 2 to 8, so in this respect reference is made to the description thereof above.

Because, in the case of the plastics component 100 described, both the base body 108 of the plastics component 100 and the fastening portions 118 are produced in one method step, the plastics component 100 may be produced particularly simply and inexpensively.

As indicated in dashed lines in FIG. 10, it may be provided for an additional element 180 or a support element 182 to be introduced into the moulding tool 146 before the base body 108 of the plastics component 100 is produced.

Plastics material in particular is then overmouldable around the additional element 180 or the support element 182.

The finished plastics component 100 thus includes on the one hand the base body 108 and on the other the additional element 180 or the support element 182.

The additional element 180 or the support element 182 may in particular take the form of a metal profile.

Preferably, the additional element 180 or the support element 182 serves to take up and transmit the forces and loads that act on the plastics component 100 in the condition of use thereof. The additional element 180 or the support element 182 is thus for example a constituent part of a load-bearing and/or force-transmitting structure of a unit that includes the plastics component 100, for example a motor vehicle.

Here, by means of the base body 180, reliable fastening points are formed on the additional element 180 or the support element 182 simply and inexpensively.

The invention claimed is:

1. A method for producing a plastics component for a power train of a motor vehicle, including:
   producing a base body of the plastics component and at least one fastening portion of the base body in a single method step of an injection molding method by means of a molding tool,
   wherein the plastics component is a one-piece injection molded component,
   wherein the base body includes the at least one fastening portion and a housing wall, wherein by means of the housing wall an inside and an outside of the plastics component are separated from one another,
   wherein the at least one fastening portion is arranged entirely on a side of the housing wall that faces the outside and extends away from the housing wall,
   wherein the fastening portion includes at least one receiving opening into which a fastening element is introducible in a direction of introduction, for the purpose of fixing it to the fastening portion,
   wherein the fastening portion includes at least one undercut portion which adjoins the receiving opening in the direction of introduction and to which the fastening element is fixable with positive engagement for the purpose of fixing it in opposition to the direction of introduction,
   wherein the fastening portion includes a hollow cylindrical receptacle which includes a wall in the shape of a cylindrical outer face and surrounds a cavity,
   wherein the receptacle further includes two slot-shaped recesses that extend parallel to an axis of symmetry of the receptacle and divide the wall into two mutually opposed wall portion, and
   wherein the wall portions of the receptacle are movable at least in certain regions in relation to one another and/or relative to a base portion of the receptacle because of the slot-shaped recesses.

2. A method according to claim 1, wherein the molding tool takes the form of a female mold tool.

3. A method according to claim 1, wherein the at least one fastening portion, in particular the at least one undercut portion, is formed by means of at least one projection from the molding tool that widens in the direction of introducing the fastening element.

4. A method according to claim 3, wherein the at least one projection is removed from the fastening portion, in particular from the undercut portion, by deforming the molding tool and/or by deforming the plastics component.

5. A method according to claim 1, wherein the molding tool includes two shaping halves that are movable in relation to one another and have surfaces which are each formed to be substantially complementary to a respective side of the base body, and in that at least one shaping element of the molding tool, in particular at least one projection from a female mold tool, is moved in relation to one or in relation to both shaping halves.

6. A method according to claim 5, wherein, for the purpose of removing the plastics component from the molding tool, first at least one shaping half and then at least one shaping element arranged movably on this shaping half is moved away from the plastics component.

7. A method according to claim 5, wherein, for the purpose of removing the plastics component from the molding tool, first at least one shaping element that is arranged movably on a shaping half and then this shaping half is moved away from the plastics component.

8. A method according to claim 1, wherein the undercut portion of the at least one fastening portion is formed by a shaping element of the molding tool that is movable transversely, in particular perpendicular, to the direction of introducing the fastening element.

9. A method according to claim 1, wherein at least one through opening that extends on only one side of the base body is formed by means of a projection from the molding tool for making the at least one receiving opening and by means of at least one movable shaping element of the molding tool.

10. A method according to claim 1, wherein the base body of the plastics component and the at least one fastening portion of the base body are molded on in an injection molding method onto an in particular metallic additional element or support element of the plastics component.

11. A plastics component for a power train of a motor vehicle, the plastics component including a base body that includes at least one fastening portion and a housing wall, wherein by means of the housing wall an inside and an outside of the plastics component are separated from one another, wherein the base body and the at least one fastening portion are made in one piece with one another, wherein the plastics component is a one-piece injection molded component, wherein the at least one fastening portion is arranged entirely on a side of the housing wall that faces the outside and extends away from the housing wall, wherein the at least one fastening portion includes at least one receiving opening into which a fastening element is introducible in a direction of introduction for the purpose of fixing it to the fastening portion, wherein the at least one fastening portion includes at least one undercut portion which adjoins the receiving opening in the direction of introduction and to which the fastening element is fixable with positive engagement for the purpose of fixing it in opposition to the direction of introduction, wherein the fastening portion includes a hollow cylindrical receptacle which includes a wall in the shape of a cylindrical outer face and surrounds a cavity, wherein the receptacle further includes two slot-shaped recesses that extend parallel to an axis of symmetry of the receptacle and divide the wall into two mutually opposed wall portions, and wherein the wall portions of the receptacle are movable at least in certain regions in relation to one another and/or relative to a base portion of the receptacle because of the slot-shaped recesses.

12. A plastics component according to claim 11, wherein the at least one undercut portion is formed by a cavity in the plastics component.

13. A plastics component according to claim 11, wherein the plastics component is a hybrid component that includes in part a material other than plastics or is formed in part from a material other than plastics.

14. A plastics component according to claim 11, wherein the plastics component is a hybrid component in which a base body of the plastics component is arranged on an additional element or support element of the plastics component.

15. A plastics component according to claim 14, wherein the base body of the plastics component is injection molded onto the additional element or support element of the plastics component.

16. A motor vehicle, including at least one plastics component according to claim 11.

* * * * *